Sept. 24, 1963  F. HAUPTMAN  3,104,546
SAFE FLIGHT AIRSPEED MECHANISM
Filed June 15, 1961  3 Sheets-Sheet 1

INVENTOR.
FREDERIC HAUPTMAN
BY
OSTROLENK, FABER, GERB & SOFFEN
ATTORNEYS

Sept. 24, 1963 F. HAUPTMAN 3,104,546
SAFE FLIGHT AIRSPEED MECHANISM
Filed June 15, 1961 3 Sheets-Sheet 2
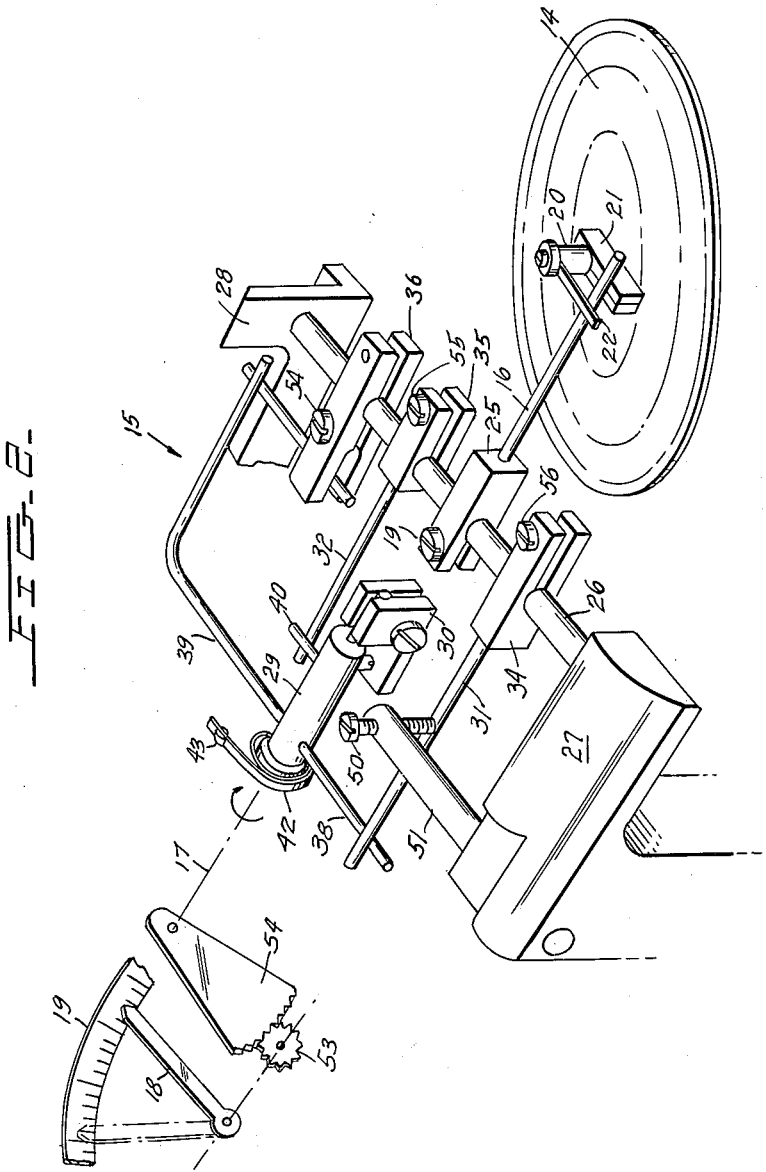
INVENTOR.
FREDERIC HAUPTMAN
BY
OSTROLENK, FABER, GERB & SOFFEN
ATTORNEYS Sept. 24, 1963  F. HAUPTMAN  3,104,546
SAFE FLIGHT AIRSPEED MECHANISM
Filed June 15, 1961  3 Sheets-Sheet 3

INVENTOR.
FREDERIC HAUPTMAN
BY
OSTROLENK, FABER, GERB & SOFFEN
ATTORNEYS

United States Patent Office 3,104,546
Patented Sept. 24, 1963

3,104,546
SAFE FLIGHT AIRSPEED MECHANISM
Frederic Hauptman, Forest Hills, N.Y., assignor to Kollsman Instrument Corporation, Elmhurst, N.Y., a corporation of New York
Filed June 15, 1961, Ser. No. 117,218
15 Claims. (Cl. 73—178)

This invention generally relates to improvements in aircraft maximum "safe" speed indicators and is particularly concerned with improvements in the computer or simulator mechanism thereof to provide a more precise approximation to the "safe" operating characteristics of the aircraft over a complete range of operating conditions.

The maximum permissive speed of travel of an aircraft through the atmosphere is a function of the aircraft design which determines the maximum allowable stresses that the craft may withstand. These stresses are a function of the aircraft speed and the pressure conditions of the atmosphere through which the craft is proceeding, which pressure is in turn, determined by such factors as the altitude of the craft and the temperature of the atmosphere.

Extensive flight studies made on high speed aircraft such as jet aircraft of current design, have reveled that the maximum permissive speed of the craft is not a continuous function of the atmospheric static pressure but may be closely simulated by a series of different mathematical functions of the pressure with the "safe" operating speed within each different range of static pressures being at a different mathematical function of the pressure within that range.

According to the present invention, there is provided an improved preprogrammed computing mechanism for performing the function of calculating and indicating this "safe" speed for each of these pressure ranges and thereby providing a more accurate simulation of the characteristics of the craft than is provided by known prior art devices. According to one preferred embodiment, the computing mechanism is exclusively comprised of positive acting mechanical elements and linkages to offer the utmost in reliability and safety as required for the applications intended. According to further features of the invention, this computing mechanism is sufficiently versatile to easily permit adjustments and variations in the different computing functions for each of the multiple ranges of pressures, thereby enabling the instrument to be easily conformed to the characteristics of any aircraft of a given type, which may have operating characteristics that are somewhat different than the others.

It is accordingly a principal object of the invention to provide an improved "safe" airspeed indicator mechanism that is more closely compatible with the operating characteristics of the craft, for enabling a pilot to move effectively and safely monitor the speed of the craft.

A further object is to provide such an indicator that is easily adaptable for application with a variety of different aircraft and easily adjustable to closely simulate and conform to the mximum speed-pressure characteristics of the craft.

Another object is to provide such an instrument having positive acting linkages and levers to offer the utmost in reliability.

A still further object is to provide a multi-range "safe" speed instrument of this type that more closely simulates the differing response of the craft at different altitude ranges and atmospheric conditions.

Other objects and additional advantages will be more readily understood by those skilled in the art after a detailed consideration of the following specification taken with the accompanying drawings wherein:

FIGURE 2 is a perspective view illustrating the operating parts of a preferred instrument according to the invention with the indicator pointer and its drive gears in exploded relation to the computer linkage;

Figure 1:
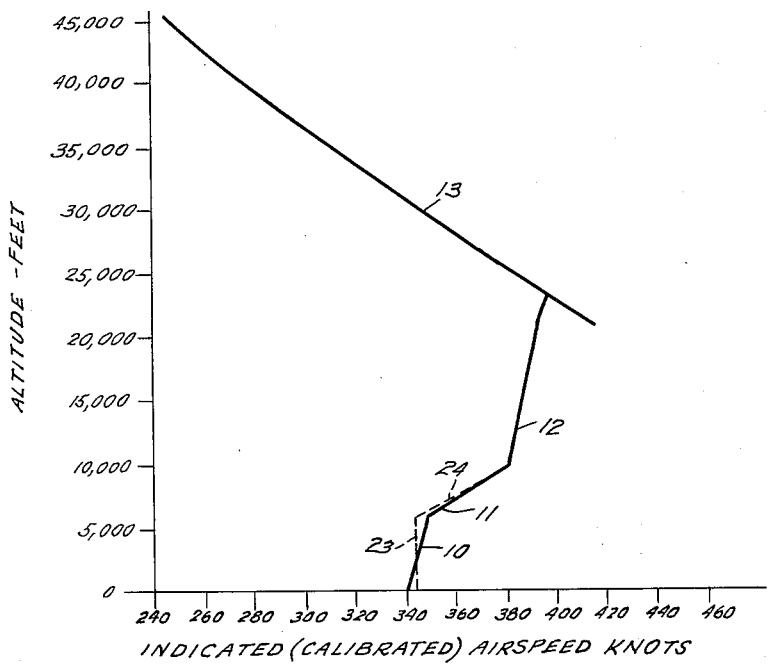
FIGURE 1 is a plotted graph generally illustrating the variation in the maximum allowable airspeed of a typical aircraft of current design at different altitudes, assuming standard atmospheric conditions.
Figure 6:
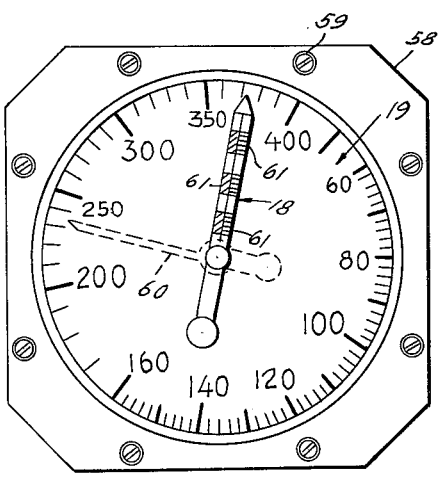
Figure 3:
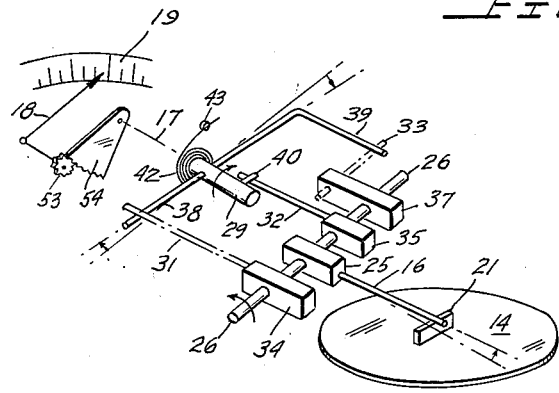
Figure 4:
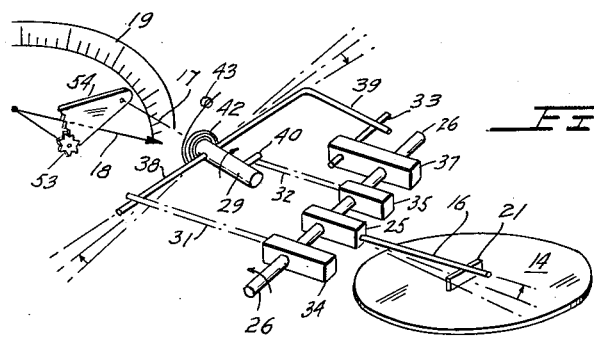
Figure 5:
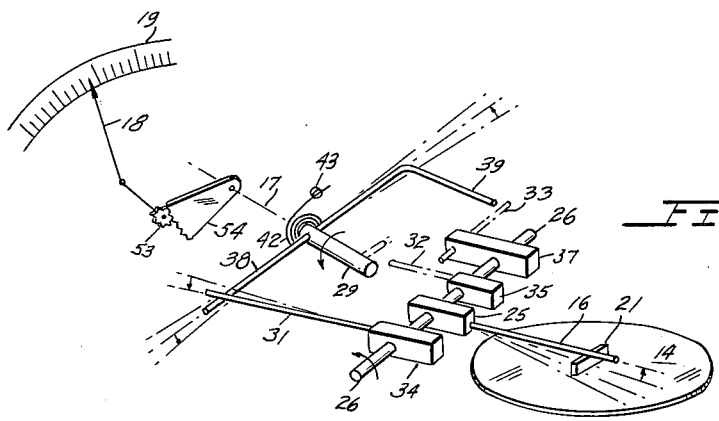

FIGURES 3, 4, and 5 are perspective views similar to FIGURE 1 for illustrating the mode of operation of the instrument of FIGURE 1, and FIGURE 6 is an elevational view illustrating the front face or dial portion of a preferred instrument according to the invention.

Preliminary to a detailed consideration of the invention, it is first believed helpful to briefly consider the characteristics of a typical aircraft of the type under consideration for the purpose of more easily understanding the mode of operation of the present invention in simulating these characteristics to continually calculate and indicate the "safe" or maximum permissive speed of the craft under different operating conditions.

As is generally indicated by the solid line plotted functions in FIGURE 1, the maximum "safe" speed of the craft has been found by extensive flight studies to follow a discontinuous mathematical function of the static pressure of the atmosphere through which the craft is proceeding. Assuming standard atmospheric conditions which determine this static pressure, the maximum "safe" speed may be plotted as a function of the altitude, as shown. Referring to FIGURE 1, it is noted that in a first range 10 at low altitudes corresponding to the higher atmospheric pressure at ground level and above, and extending from takeoff to about 7000 feet, the maximum "safe" speed may be very gradually increased as the craft ascends over a narrow range of from about 335 knots to 345 knots whereas during the next higher range of altitudes, indicated by the range 11, and extending from about 7000 to 10,000 feet, the craft may "safely" increase speed at a more rapid rate with progressively higher altitudes, from about 345 knots at 7000 feet to about 380 knots at 10,000 feet due primarily to the progressive reduction in the static pressure of the atmosphere in the range. As the craft ascends further into the range 12 extending from about 10,000 feet to 25,000 feet, the maximum speed may also be progressively increased with safety, as shown, due to further reductions in the static pressure from about 380 knots to somewhat over 400 knots, but at a much slower rate than in the preceding range 11 due to other effects taking place. However, when the craft reaches an altitude of about 25,000 feet and continues to ascend to its maximum ceiling altitude of about 45,000 feet, in the range indicated as 13 in FIGURE 1, the known characteristics of the craft require that its maximum speed be progressively diminished, as indicated by the negative slope of the curve 13 so that upon reaching its maximum ceiling altitude of 45,000 feet, the craft speed should be no greater than about 250 knots to proceed with safety.

The corresponding figures for actual instruments are set forth below:

*Type 3294 and 3295*

(1) Linear variations from 340 knots EAS at sea level to 348 knots EAS at 6000 feet (switch over point is 6000 feet, 348 knots IAS).

(2) Linear variations from 345 knots EAS to 375 knots EAS from 6000 to 10,000 feet (switch over point is 10,000 feet, 381 knots IAS).

(3) EAS of 375 knots governs from 10,000 feet to 23,400 feet.

(4) Mach #0.9 governs above 23,400 feet (switch over point is 23,400 feet, 396 knots IAS).

*Type 3390*

(1) Linear variations from 342 knots IAS at sea level to 350 knots IAS at 6000 feet.

(2) Linear variation from 350 knots IAS at 6000 feet to 383 knots IAS at 10,000 feet.

(3) Linear variation from 383 knots IAS at 10,000 feet to 393 knots IAS at 20,000 feet.

(4) Linear variation from 393 knots IAS at 20,000 feet to 398 knots IAS at 23,000 feet.

(5) Mach number 0.905 minus 4 knots governs above 23,000 feet (switch over point is 23,000 feet at 398 knots IAS).

EAS stands for equivalent airspeed and is defined as $$Veq = 120.82 \, M_1 \times \sqrt{P_1} \text{ knots}$$

or $$Veq = V_{True} \times \sqrt{\frac{P}{P_0}} (P \rightarrow rho)$$

IAS is called "indicated or calibrated" airspeed and is a function of differential pressure $\Delta p$. The maximum section of my novel instrument is calibrated like a pressure altimeter using the same standard pressure-altitude tables, for instance NACA #1235. The values of these tables incorporate temperature changes for various altitudes.

It is to be understood that the plotted function of FIGURE 1 is merely representative of many current aircraft designs but that some variations will occur for different aircraft in the "safe" speeds in different ranges, the rate of permissive speed variations within the ranges, and in the extent of the ranges. It is also to be understood that although FIGURE 1 illustrates that the "safe" speed of the craft is a discontinuous function related to the altitude of the craft, the "safe" speed for any craft is in reality a multirange function of the static atmospheric pressure and consequently, the present invention functions in response to atmospheric pressure, thereby taking into account variations in temperature and other atmospheric conditions affecting the pressure.

According to the present invention, there is provided an instrument that includes a simulator or computing mechanism that is preprogrammed for the aircraft in which it is employed, to substantially reproduce the multirange function of FIGURE 1 and compute and indicate the "safe" speed at each different pressure of the atmosphere through which the craft is proceeding.

Referring now to FIGURE 2, the preferred instrument generally comprises, a static pressure detector 14, that is conveniently of a bellows type aneroid diaphragm, as indicated, or of other type well known in the art having a displaceable member corresponding to static pressure, a preprogrammed computer linkage, generally indicated at 15, having an input arm 16 connected for actuation by the pressure detector 14, and positioning an output arm or shaft 17 according to the multirange function of FIGURE 1 thereby to operate an indicator that is preferably comprised of a pointer 18 movable with respect to a graduated airspeed dial or scale 19.

The static pressure detector is preferably a sealed unit and consequently expands or contracts proportionately to the static pressure of the atmosphere to which it is exposed. This detector 14 is suitably connected to position upwardly and downwardly the input shaft 16 of the computer mechanism by such means as attaching an upstanding boss member 20 and rest bar 21 centrally on the diaphragm 14 with the bar 21 disposed beneath the arm 16, and suitably attaching a spring wire or flat spring strip 22 to the boss 20 and located above the arm 16 thereby to spring urge the arm 16 downwardly into engagement with the bar 21 for actuation by the pressure detector 14.

The computer or aircraft simulator mechanism 15 comprises in its broadest aspects a variable drive ratio mechanism, interconnecting the input shaft 16 and the output shaft 17 to variably displace the output 17 according to a close approximation of the multirange discontinuous function shown in FIGURE 1. For purposes of simplifying this mechanism and rendering it more dependable, the computer does not identically follow the multirange function shown by the solid lines 10, 11, 12 and 13 but instead reproduces the dotted line functions 23 and 24 corresponding to the lower ranges 10 and 11. However, as will become apparent as the specification proceeds, the preferred mechanism may be easily modified to identically reproduce these or related functions.

Specifically considering details of the preferred multifunction linkage, the input arm 16 is connected by means of a suitable clamp 25 to angularly displace a rocker shaft 26. The rocker shaft 26 is rotatably supported at opposite ends thereof within suitable supports 27 and 28 whereby the rocker shaft 26 is angularly displaced about its lengthwise axis in response to displacement of input shaft 16.

The output shaft 17 is also connected to or integral with a similar rocker arm 29 that is rotatably supported at its opposite ends thereof, by such means as an adjustable pivot member 30, as shown, thereby permitting the output rocker arm 29 and output shaft 17 to be angularly displaced about their lengthwise axis.

For interconnecting the input and output rocker arms 26 and 29 to provide the multirange drive function desired, each of said rocker arms is provided with three outstanding lever arms of different length with the lever arms of the input rocker arm adapted to each mate with a different one of the lever arms on the output rocker arm 29 thereby to continually provide a positive drive connection between the input and output rocker arms. Each of said pairs of lever arms entering into engagement provides a different ratio drive connection between the input and output shafts corresponding to a different one of the mathematical functions or ranges 24, 12, and 13 of FIGURE 1, and said pairs of lever arms are disposed on their associated rocker arms to enter into engagement sequentially with continued displacement of the input shaft 16, thereby to drive the output arm 17 at a different predetermined ratio for each different range of displacement of the input arm 16.

Returning to FIGURE 2 for further details, the input rocker shaft 26 is provided with three different length lever arms 31, 32, and 33, each of said lever arms being mounted within or attached to a clamp member 34, 35, and 36 respectively, at one end thereof, and with the clamp members 34, 35 and 36 each being detachably connected to the input rocking shaft 26 by means of tightening the clamp screws 54, 55 and 56, respectively, supplied with each clamp. On the output rocker arm 29, there is likewise provided three different length lever arms 38, 39, and 40, with lever arm 38 being disposed to engage lever arm 31, lever arm 39 disposed to engage lever arm 33, and lever arm 40 disposed to engage lever arm 32. The lever arms 31, 32, and 33, being connected to the input rocker arm 26, are each selected to possess a length relative to the length of their corresponding or mating arm supported on the output rocking shaft 29 to provide a different drive ratio therebetween corresponding to a different range in FIGURE 1. These lever arms 31, 32, and 33 on the input shaft are also relatively angularly adjustable on the input rocker arm 26, by means of the adjustable clamps, thereby to each engage its mating lever arm on the output rocking shaft 29 in sequence and at a different angular displacement of the input shaft 16. Consequently, each of the pairs of lever arms are adjustable in both length and position to provide a series of adjustable ratio positive drive connections between the input and output shafts corresponding to a different one of the ranges 24, 12, and 13 of FIGURE 1, whereby, for example, in response to a displacement of the input arm corresponding to range 11 in FIGURE 1, the relatively long lever arm 32 on the input rocker arm 26 engages the short lever arm 40 on the output to provide the predetermined higher ratio drive between the input and output corresponding to this range 11 and upon continued displacement of the input arm 16 in the same direction, the lever arms 33 and 39 enter into engagement, disengaging the prior arms 32 and 40 and coupling the input and output rocker arms by a lower ratio drive connection corresponding to the range 12 in FIGURE 1.

For reversing the relative direction of rotation of the output shaft 17 upon continued displacement of the input arm 16 corresponding to the range 13 in FIGURE 1, the third pair of lever arms 38 and 31 are located on the opposite side of the axis of rotation of the output rocker arm 29, from the other pairs of lever arms, whereby when these arms enter into engagement with one another, the output shaft 17 is driven in the reversed direction as desired.

To always maintain one of the pair of lever arms in engagement, the output rocker shaft 29 is continuously biased for displacement in the clockwise direction by means of a spiral spring 42 having an inner end thereof fastened to the rocker shaft 29 and the outer end thereof immovably affixed at 43 to the instrument housing as is generally illustrated.

For a pictorial illustration of the detailed mode of operation of the multirange computing mechanism for each different range of pressures, reference is now made to FIGURES 3, 4, and 5 illustrating the different linkages in engagement during each range of pressures.

In the first range of pressure (altitude) variation 10 of FIGURE 1, it is noted that the permissible "safe" speed variation is very small and consequently, the maximum speed is substantially constant over this range and may be approximated by the dotted function line 23. To simulate this characteristic, the mechanism of FIGURE 1 is provided with a lost motion connection between the pressure detector 14 and the input arm 16 to the linkage as follows: Initially, the biasing spring 42 urges the output rocker shaft 29 in the clockwise direction until its lever arm 38 engages the lever arm 31 of the input rocker shaft thereby urging the input rocker shaft 26 in the counterclockwise direction, until the lever arm 31 is restrained by contacting the base of the adjustable stop screw 50. As shown, the stop screw 50 is supported within an extension 51 of the housing whereby adjustment of the screw 50 permits adjustment of the maximum "safe" speed indication by pointer 18. The detector 14 is in a contracted position by the higher static pressure at ground altitude so that a lost motion clearance exists between the input arm 16 and the rest bar 21 on the detector member 14. As the craft ascends from ground altitude to about 7000 feet, the pressure detector 14 progressively expands with reduction of static pressure, thereby displacing the rest bar 21 upwardly until the rest bar 21 enters into contact with input arm 16 at the pressure corresponding to about 7000 feet. During this initial displacement of the pressure detector 14 over the initial altitude range 23 of FIGURE 1, therefore, the input arm 16 of the linkage is not displaced and the output shaft 17 and indicator 18 likewise remain fixed thereby indicating a constant "safe" maximum speed as is desired.

During the succeeding range of increasing altitude or reduced pressure corresponding to range 24 in FIGURE 1, the progressively continued expansion of the detector 14 displaces the rest bar 21 upwardly against the input arm 16 thereby displacing the input arm 16 upwardly as shown in FIGURE 3 to angularly displace the input rocker shaft 26 in the counterclockwise direction. This angular displacement lowers the lever arm 32 connected thereto. As a result, the lever arm 40 on the output rocker arm 29 is spring urged against lever arm 32 and is also displaced downwardly permitting the output rocker arm 29 and the output shaft 17 to move in a clockwise direction and displace the indicator pointer 18 over its scale 19 in proportion thereto. The ratio of lengths or moment of the lever arm 40 and lever arm 32 corresponds to the slope of the curve 24 in FIGURE 1 whereby during this range of static pressure variations, the indicators 18 and 19 indicate the "safe" airspeed according to the function 24 in FIGURE 1.

When the craft has experienced a static pressure corresponding to the beginning of the next range of altitude, occurring at about 10,000 feet as shown in FIGURE 1, the output rocker arm 29 has been displaced in the clockwise direction by a sufficient angle to enable its second lever arm 39 to engage the second input lever arm 33, as best shown in FIGURE 4. Since the second lever arm 39 is of longer length and moment than the first output lever arm 40, as shown, a given angular displacement of output rocker arm 29 produces a greater distance displacement at the end or contacting position of lever arm 39 than at the end or contacting position of first lever arm 40. Consequently, after arms 39 and 33 are brought into engagement, the first pair of lever arms 40 and 32 are disengaged and the succeeding drive ratio between the input arm 16 and output shaft 17 of the linkage is in accordance with a second drive ratio determined by the relative lengths of arms 39 and 33. The relative lengths of these latter lever arms 39 and 33 are proportioned according to the ratio indicated as range 12 in FIGURE 1 whereby during this range of static pressures (altitudes corresponding from 10,000 feet to about 25,000 feet) the indicator mechanism is driven at a different rate corresponding to slope of range 12 in FIGURE 1.

As the aircraft ascends still higher and experiences a pressure corresponding to an altitude of about 25,000 feet, the continued counterclockwise displacement of the first rocker shaft 26 in following further contraction of the detector 14, brings the third lever arm 31 downwardly and into engagement with the corresponding third lever 38 on the output rocker shaft 26. The third lever arm 31 is located on the opposite side of the central axis of displacement of output rocker arm 29 as shown and, therefore, a continued downward displacement of lever arm 31 in response to continued counterclockwise movement of input rocker arm 26 drives the output rocker arm 29 in the opposite or counterclockwise direction as best shown in FIGURE 5, thereby to disengage the prior linkage of the pairs of lever arms 39 and 33. The relative lengths or ratio of the arms 31 and 38 is selected according to the slope or proportion 13 in FIGURE 1 whereby in response to continued actuation by the detector, the indicator pointer 18 follows the curve 13 to proportionally reduce the indicated "safe" speed in the manner shown.

Thus in the manner depicted in FIGURES 3, 4 and 5 there is provided a multifunction linkage for closely simulating the "safe" speed characteristics of the craft over a complete range of operating conditions.

For making the necessary adjustment permitting the instrument to be employed with different aircraft having varying characteristics, both the length and the angular position of the lever arms 31, 32, and 33 may be varied as desired to vary both the ratio or slope of the mathematical functions in the ranges 24, 12, and 13 of FIGURE 1 as well as the extent of the range of engagement of these lever arms with their corresponding lever arms on the output rocker shaft 29. Varying the relative length or ratio of the moment arms may be easily performed by loosening the tightening screws 54, 55 and 56 on the clamps retaining these arms to the input rocker shaft 26 and reciprocally displacing the lever arms length wise along the rocker arm 26 thereby to engage the lever arms 38, 39 and 40 on the output rocker shaft at different positions and correspondingly vary the drive ratio.

To vary the ranges of engagement of the different pairs of lever arms, the clamps 34, 35 and 36 may be similarly loosened and the lever arms 31, 32, and 33 may be individually angularly displaced on the input rocker arm 26 after which the clamps are retightened. This variation determines the angular displacement of the input rocker arm 26 at which each succeeding pair of lever arms enters into engagement.

FIGURE 6 illustrates details of the preferred front face portion of the visual indicator mechanism including the graduated scale 19 and the angularly movable pointer 18 relatively displaceable over the dial to indicate "safe" speed. As in prior instruments of this type, the outer housing 58 also preferably includes therein, a mechanism (not shown) for positioning an airspeed pointer 60 concentrically with the "safe" speed pointer 18, whereby the pilot may easily compare the existing airspeed with the maximum "safe" airspeed as computed by the present invention. According to another feature of the invention, the "safe" airspeed pointer 18 is preferably provided with a series of color markings 61 or other visible markings as desired in a distinctive pattern arrangement thereon as shown, whereby the "safe" airspeed pointer 18 may be easily distinguished visually from the present airspeed pointer 60 enabling the pilot to more easily compare the speeds.

The mechanism herein described, which is normally used as a "safe" speed indicator showing $V_{NE}$ (never exceed) airspeed, may also be used to indicate $V_{NO}$ (normal operation) airspeed, by simply calibrating the instrument to a lower value.

Although but one preferred embodiment of the invention has been illustrated and described, many variations and modifications may be made without departing from the spirit and scope of the invention. Accordingly, this invention should be considered as being limited only according to the following claims appended hereto.

What is claimed is:

1. A maximum safe speed indicator mechanism comprising: a static pressure detector, an indicator having a displaceable member, and a discontinuous function linkage interconnecting said detector and indicator for producing a displacement of the indicator simulating the "safe" speed characteristics of an aircraft, said function linkage including means providing a lost motion connection between the detector and indicator for a first range of static pressure variations, means providing a first ratio drive connection between the detector and indicator for a second range of static pressure variations, means providing a second ratio drive connection between said detector and indicator for a third range of pressure variations, and including means for providing a third ratio of drive connection between said detector and indicator for a fourth range of pressure variations.

2. In the indicator of claim 1, said first, second and third drive ratios being linear, and said third range being in the reversed direction.

3. In the device of claim 2, means for enabling independent adjustment of the relative ranges of pressure variation for each drive ratio and lost motion connection.

4. In the device of claim 3, means for enabling independent adjustment of each of the drive ratios.

5. In a maximum air speed indicator having a static pressure transducer and an indicator having a movable indication part, an angularly displaceable input shaft having a plurality of lever arms of different length, an angularly displaceable output shaft having a plurality of different length lever arms, each output shaft lever arm adapted to engage with a different input shaft lever arm for a different range of angular displacement of the input shaft, means interconnecting said input shaft to said transducer through a lost motion connection, and means interconnecting said indicator with said output shaft.

6. In the speed indicator of claim 5, the ratio of lengths between the corresponding input shaft lever arms and output shaft lever arms being different and conforming to the discontinuous mathematical function relating the maximum speed of the aircraft to the static pressure of the atmosphere.

7. In the device of claim 6, the ratio of lengths of the corresponding lever arms being individually adjustable and the ranges of engagement of said corresponding arms being adjustable to closely conform with the characteristics of a particular aircraft.

8. In the device of claim 7, the lever arms on one of said input and output shafts being relatively angularly adjustable whereby each pair of corresponding arms remains in engagement until a succeeding pair of corresponding arms engage one another.

9. In the device of claim 8, spring biasing means continuously maintaining one of said pairs of arms in engagement.

10. In the device of claim 8, one of said pairs of arms being engageable to angularly displace the output shaft in the opposite direction relative to said input shaft than said other lever arms.

11. In a maximum air speed indicator having a movable indicator and a static pressure transducer, means for reversedly displacing said indicator responsive to unidirectional displacement of said transducer comprising a function linkage having a plurality of pairs of lever arms, each pair adapted to engage in sequence with continued displacement of said transducer, and at least one pair engaging to provide a drive coupling therebetween in a direction opposite from that of the others.

12. In a maximum permissible airspeed indicator, a movable indicator device, an atmosphere static pressure transducer, and a plurality of separately engaging linkages for operatively connecting the indicator device and the pressure transducer to vary the extent of movement of the indicator according to a series of predetermined mathematical functions of the transducer displacement, said plurality of linkages being sequentially engageable upon continued displacement of the transducer in the same direction, each of said linkages providing a different drive function corresponding to the differing characteristics of the aircraft at different ranges of static pressures.

13. In the indicator of claim 11, said linkages being individually adjustable to vary the drive ratios, and said linkages being further adjustable to vary the duration of engagement of the different linkages.

14. In the indicator of claim 12, said interconection between said movable indicator and pressure transducer additionally providing a lost motion connection for a given range of displacement of said transducer and one of said linkages providing reversed direction drive ratio therebetween.

15. In the indicator of claim 13, said separately engaging linkages comprising a plurality of first lever arms connected for common displacement, a second plurality of lever arms connected for common displacement, each of said first lever arms adapted to engage a different one of said second arms to provide pairs of engaging arms in sequence, the ratio of lengths of each of said pairs being different and conforming to the maximum speed-pressure ratio of the aircraft for a different range of pressure conditions.

References Cited in the file of this patent

UNITED STATES PATENTS

| | | |
|---|---|---|
| 2,424,511 | Stanley et al. | July 22, 1947 |
| 2,927,460 | Darbujan | Mar. 8, 1960 |

OTHER REFERENCES

Publication: "Instrument Practice," an article by Flindt on "The Design of Flight Instruments," September 1956, pages 793–796. (Copy in Div. 36.)